United States Patent
Riedl et al.

(10) Patent No.: US 7,355,314 B2
(45) Date of Patent: Apr. 8, 2008

(54) DEVICE FOR REVERSING ROTATIONAL DIRECTION OF A MOTOR

(75) Inventors: Reinhard Riedl, Finning (DE); Markus Hartmann, Mauerstetten (DE)

(73) Assignee: Hilti Atktiengesellschaft, Schaan (LI)

( * ) Notice: Subject to any disclaimer, the term of this patent is extended or adjusted under 35 U.S.C. 154(b) by 0 days.

(21) Appl. No.: 11/478,712

(22) Filed: Jun. 29, 2006

(65) Prior Publication Data

US 2007/0001536 A1    Jan. 4, 2007

(30) Foreign Application Priority Data

Jul. 4, 2005    (DE) .................... 10 2005 000 084

(51) Int. Cl.
*H02K 13/00* (2006.01)
(52) U.S. Cl. ........................................ 310/239; 310/50
(58) Field of Classification Search ................. 310/50, 310/71, 239–242, 247
See application file for complete search history.

(56) References Cited

U.S. PATENT DOCUMENTS

| | | | | |
|---|---|---|---|---|
| 3,440,465 A | * | 4/1969 | Provost, Jr. et al. | 310/230 |
| 3,919,574 A | * | 11/1975 | Schmuck | 310/68 R |
| 4,613,781 A | * | 9/1986 | Sanders | 310/239 |
| 4,978,877 A | * | 12/1990 | Quirijnen | 310/239 |
| 5,753,993 A | * | 5/1998 | Steidle et al. | 310/239 |
| 6,124,652 A | * | 9/2000 | Karasa et al. | 310/50 |
| 6,133,665 A | * | 10/2000 | Prell et al. | 310/239 |
| 6,225,717 B1 | * | 5/2001 | Burger et al. | 310/71 |
| 6,479,918 B1 | * | 11/2002 | Burger et al. | 310/241 |
| 6,586,855 B2 | * | 7/2003 | Burger et al. | 310/88 |
| 6,930,431 B2 | * | 8/2005 | Buck et al. | 310/239 |
| 6,998,754 B2 | * | 2/2006 | Nedriga et al. | 310/242 |

* cited by examiner

*Primary Examiner*—Thanh Lam
(74) *Attorney, Agent, or Firm*—Abelman, Frayne & Schwab

(57) ABSTRACT

An electrical hand-held power tool (2) includes an electric motor (4) with a stator (12), and a device (26) for reversing the rotational direction of the motor (4) and which has a contact carrier (28) fixedly securable on the stator housing with a releasable connection element and having field contacts (32) electrically connectable with the stator winding (14), and fixed contacts (42a, 42b) electrically connected with the field contacts (32), with the reversing device (26) also including a brush carrier (30) provided with carbon guides (48) and switching contacts (52a, 52b) electrically connected with the carbon guides (48) and electrically connectable with the fixed contacts (42a, 42b) of the contact carrier (28), the brush carrier (30) being rotatable relative to the contact carrier (28), and the stator housing (16) having an axial stop for the brush carrier (30).

7 Claims, 3 Drawing Sheets

DEVICE FOR REVERSING ROTATIONAL DIRECTION OF A MOTOR

BACKGROUND OF THE INVENTION

1. Field of the Invention

The present invention relates to an electrical hand-held power tool with an electric motor having a stator housing and a device for reversing the rotational direction of the electric motor. The reversing device has a contact carrier fixedly securable on the stator housing with releasable connection means. On the contact carrier, there are provided field contact means for an electrical connection with the stator winding and fixed contacts means electrically connected with the field contact means. The reversing device further has a brush carrier rotatable relative to the contact carrier and on which there are provided two carbon guides and switching contact means electrically connected with carbon guides. The switching contact means are electrically connectable with fixed contacts of the contact carrier in respective rotational end positions.

2. Description of the Prior Art

Electrical hand-held tools of the type discussed above have a universal motor with a commutator that is electrically connected with carbon brushes arranged in carbon guides. In order to achieve an optional commutation for both rotational directions, both carbon guides are rotated in a circumferential direction, together with the carbon guide-supporting, brush carrier, upon changing from clockwise rotation to counterclockwise rotation, with a handle accessible from outside. With the rotation of the brush carrier, simultaneously reversal of the carbon brushes relative to the fixed contact means takes place and, thus, a change in the rotational direction of the motor.

German Publication DE 195 45 651A1 discloses an electrical hand-held power tool with a reversible electric motor. There is further provided a device for reversing the carbon brushes and which has a contact plate and a brush carrier. The contact plate is fixedly secured on the stator of the electric motor by plug connection. From the contact plate, hook elements project which engage the brush carrier from behind and, thus, rotatably supporting the same on the contact plate. In the contact plate, there is provided a groove in which, in an assembled condition, a switchable contact system for reversing the carbon brushes is located. At the free end, a shoulder-forming edge of the brush carrier abuts the contact plate for sealing purposes.

In this way, on one hand, penetration of dust into the contact system is prevented and, on the other hand, axial position of the brush carrier is secured. Moreover, the motor, the contact plate, and the brush carrier can be separately produced and easily assembled, which reduces the costs of manufacturing of the electrical hand-held power tool.

The drawback of the known reversing device consists in that between the brush carrier and the contact plate a certain clearance must be maintained in order to ensure the rotation of the brush carrier. In addition, the position of the contact plate relative to the stator, in particular, in case the contact plate is attached to the stator by using plug connection means, also requires some clearance and varies dependent on manufacturing tolerances. Therefore, the fitting position of the carbon brushes relative to the commutator depends to a significant extent on tolerances, which results in poor commutation and can lead to an increased wear of the carbon brushes.

Accordingly, an object of the present invention is an electrical hand-held power tool in which the foregoing drawbacks of the prior art tool are eliminated.

Another object of the present invention is to provide an electrical hand-held power tool in which a precise fitting position of the carbon brushes relative to the commutator is ensured.

A further object of the present invention is to provide an electrical hand-held power tool that can be cost-effectively produced.

SUMMARY OF THE INVENTION

These and other objects of the present invention, which will become apparent hereinafter, are achieved by providing on the stator housing an axial stop for the brush carrier.

The brush carrier directly adjoins the stator housing, whereby the fitting position of the brush carrier is determined. The stator housing can itself be formed by the support case of the stator winding or by the motor housing in which the stator is mounted. In this way, the brush carrier can be precisely aligned relative to the housing which again permits to achieve a precise fitting position of the carbon brushes relative to the commutator. This, in turn, results in a better commutation and a smaller carbon brush wear.

According to a particular advantageous embodiment of the present invention the axial stop is formed by a slideway formed in the stator housing and along which the carbon guides are displaceable. Thereby, the carbon guides themselves are supported on the stator housing, whereby the fitting position of the carbon brushes relative to the commutator can be even more exactly determined. The slideway can be formed as a continuous element or divided in two sections.

Advantageously, the carbon guides have inclined surfaces which abut, in two rotational end positions, correspondingly inclined bearing surfaces formed on respective circumferential stops projecting from the stator housing and, thereby, located adjacent to the stator housing. The carbon guides are, thereby, pressed against respective axial stops. In this way, on one hand, the carbon guides are secured in both rotational end positions in the circumferential direction and, simultaneously, are preloaded axially against the axial stop. Thereby, particular stable and exact rotational end positions of the reversing device are achieved, which ensures a good commutation despite vibrations and impacts to which the electrical hand-held power tool is subjected during operation.

It is advantageous when between the brush carrier and the contact carrier, at two circumferentially opposite positions, there is provide, respectively, spring means acting in radially opposite directions. This ensures a precise centering of the brush carrier relative to the contact carrier and the stator housing.

Advantageously, the spring means is formed by a leaf spring supported on the brush carrier and having two rounded ends extending through respective openings of the brush carrier and supported against the contact carrier.

Thereby, the centering of the brush carrier is obtained with a cost-effective leaf spring that is easily mountable by being supported on the brush carrier.

Advantageously, the fixed contact means is formed by respective jaw-shaped contacts between which respective contacts of the switching contact means are clamped. This ensures a particularly stable electrical connection between the switching contact means and fixed contact means and which is not sensitive to vibrations and impacts.

It is advantageous when the brush carrier is axially supported on the housing of the power at its end remote from the stator. Thereby, the brush carrier can be secured in a simple manner in a second axial direction by an appropriate stop. This ensures a permanent bearing of the carbon guides against the slideway. This axial stop can be formed by housing ribs or shoulder which the brush carrier engages in the axial direction during the assembly.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENTS

Figure 1:
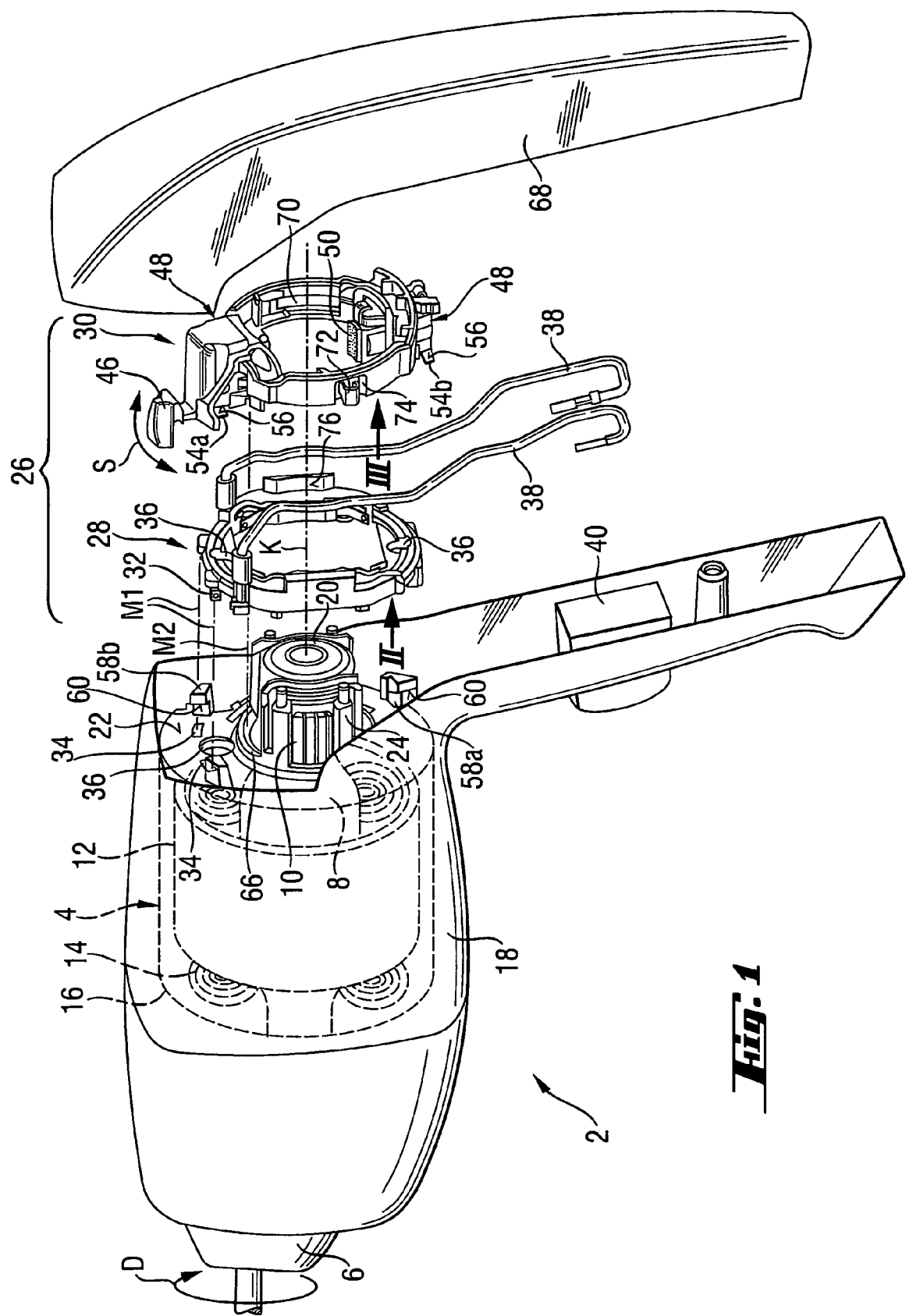
FIG. 1 a perspective exploded view of an electrical hand-held power tool.

An electrical hand-held power tool 2 according to the present invention, e.g., combined drilling and screw-driving tool, which is shown in FIG. 1, has an electric motor 4 for driving a chuck 6 which is not shown in detail. The electric motor 4 has a rotor 8 and a commutator 10 connected with the rotor 8 for joint rotation therewith and rotatable about a commutator axis K.

Around the rotor 8, there is arranged a stator 12 with a stator winding 14. The stator 12 is located in a stator housing 16 shown with dash lines and which is fixedly secured in the housing 18 of the electrical hand-held power tool 2.

The commutator 10 is supported, at its end remote from the rotor 8, on a bearing block 20 that is itself supported on holding ribs 24 which project from an end side 22 of the stator housing 16.

Figure 2:
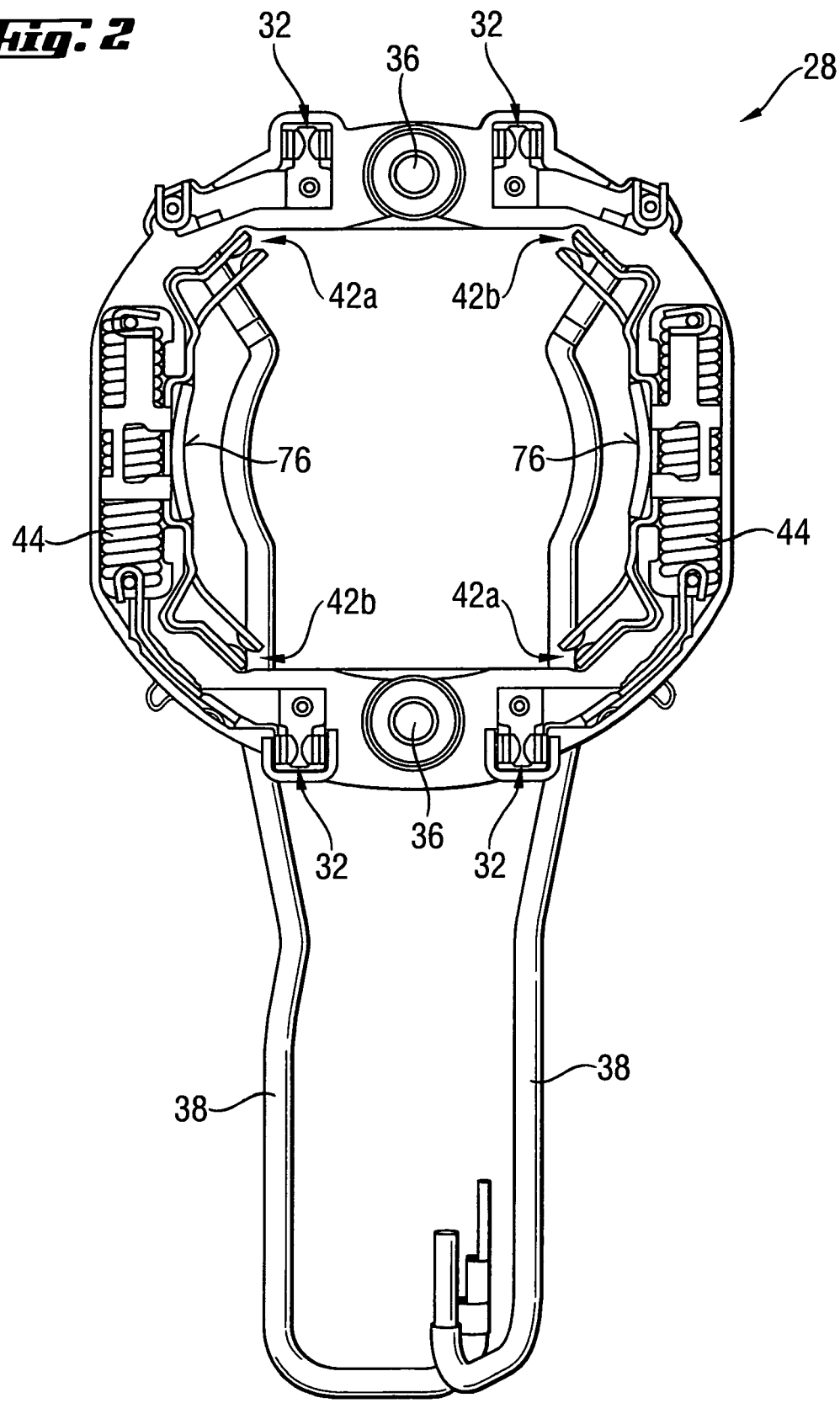
FIG. 2 a plan view in direction II in FIG. 1 on a contact carrier of the electrical hand-held power tool shown in FIG. 1.

As shown in FIG. 2, during the assembly of the electrical hand-held power tool 2, a reversing device, which is generally designated with a reference numeral 26, is mounted about the commutator 10 and the holding ribs 24 and is arranged at the end side 22 of the stator housing 16. The stator housing 16 has an annular contact carrier 28 and a likewise annular, brush carrier 30.

The contact carrier 28 is so arranged on the stator housing 16 that the field contacts 32, which are provided on the contact carrier 28, extend, in accordance with the assembly lines M1, into contact openings 34 formed in the end side 22 of the stator housing 16. In the contact openings 34, there are provided contact tongues, not shown, which are connected with the stator winding 14. In addition, the contact carrier 28 is fixedly secured to the end side 22 with screws, not shown. To this end, there are provided respective openings 36 on the contact carrier 28 and in the end side of 22.

As further shown in FIG. 2, the field contacts 32 are formed by jaw-shaped contact pairs between which the contact tongues, not shown, of the stator winding 14 are clamped. The field contacts 32 are electrically connected on the contact carrier 28 with switching braids 38 for contacting the power tool switch 40 (FIG. 1) and with jaw-shaped fixed contacts 42a, 42b which are provided in the opening of the annular contact carrier 28 and are open in the circumferential direction. Between the fixed contacts 42a, 42b and the field contacts 32, there are provided interference suppression elements 44.

Figure 3:
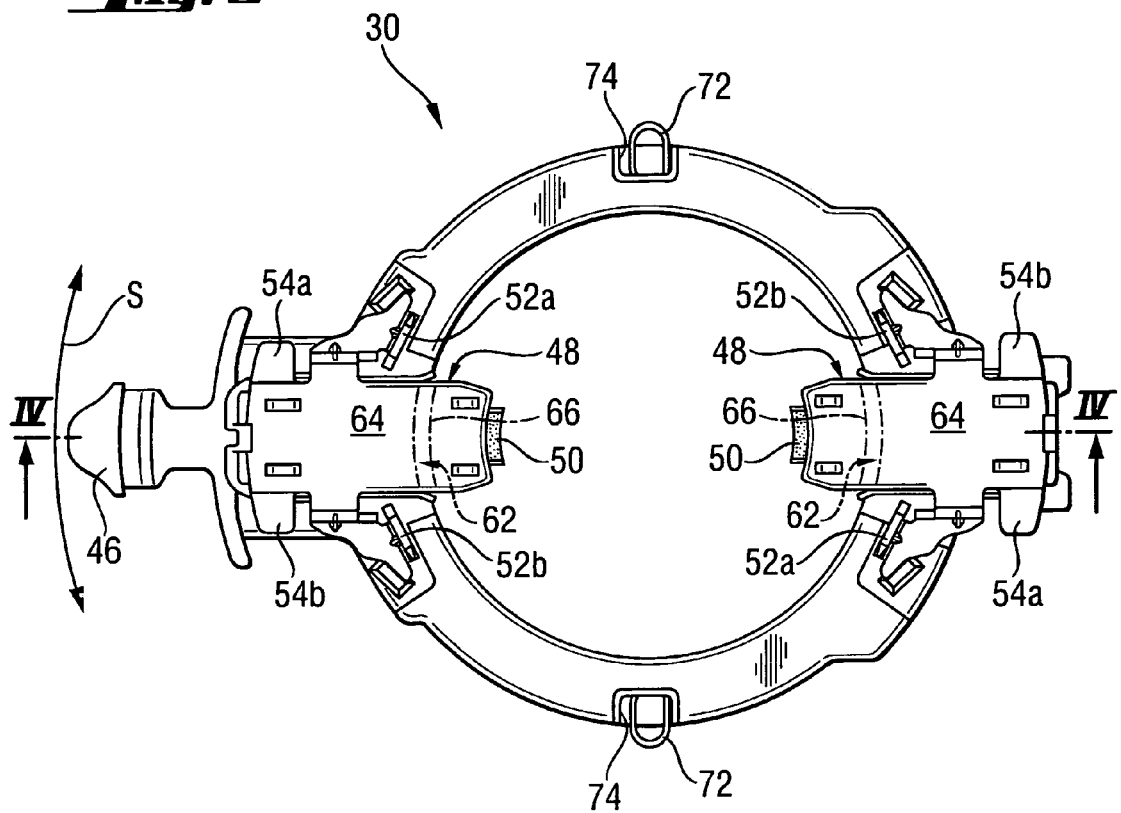
FIG. 3 a plan view in direction III in FIG. 1 on a brush carrier, which is pivoted by 90°, of the electrical hand-held power tool shown in FIG. 1.
Figure 4:
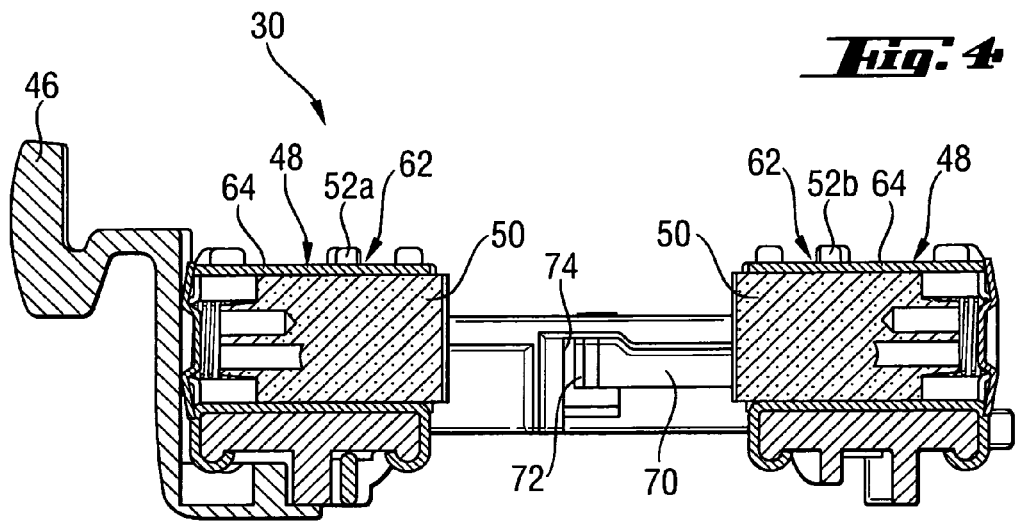
FIG. 4 a cross-sectional view along line IV-V in FIG. 3 of the brush carrier.

A brush carrier 30, which is shown in detail in FIGS. 3-4, is rotatable in the pivot direction S relative to the stator 12 and the contact carrier 28 in two pivot positions with a handle 46 accessible from outside of the tool housing 18. The brush carrier 30 has two carbon guides 48 in which respective carbon brushes 50 are preloaded toward the middle of the annular brush carrier 30 for contacting the commutator 10.

From the carbon guide 48, two switching contacts 52a, 52b in form of contact tongues project on both sides in the pivot direction S. Upon rotation of the brush carrier 30, the switch contacts 52a, 52b of the carbon guide 48, which extend in the rotational direction, are pushed into respective jaw-shaped fixed contacts 42a, 42b, which extend in a direction opposite the rotational direction, and are clamped therein.

Further, on each carbon guide 48, there is provided, on both sides in the pivot direction S, bearing elements 54a, 54b which form respective inclined surfaces 56 (see FIG. 1). The bearing elements 54a, 54b cooperate with respective stops 58a, 58b which project, as shown in FIG. 1, from the end side 22 of the stator housing 16 in the direction of the brush carrier 30 in somewhat L-shaped form. The stops 58a, 58b form a bearing surface 60 that faces the end side 22 of the stator housing 16.

Thus, upon actuation of the handle 46, the brush carrier 30 can be rotated relative the stator housing 16 and the contact carrier 28 along the pivot direction S in the two opposite pivotal positions in which the bearing elements 54a, 54b of the carbon guides 48 engage respective stops 58a, 58b. In this way, as a result of an alternating contact between the fixed contacts 42a, 42b and switching contacts 52a, 52b, a reversal of carbon brushes 50 and thereby a reversal of a rotational direction D of the electrical motor 4 and the chuck 6 takes place. Simultaneously, the carbon brushes 50 occupy, in both rotational positions, a position in which an optimal commutation is achieved for a respective rotational direction.

With the inclined surfaces 56 being pressed against the bearing surfaces 60, the brush carrier 30 is preloaded in the axial direction toward the stator 12. Thereby, the carbon guides 48 are pressed in both rotational positions against the slide path 66 in the protection region 62 of the bottom sheet 64 (please see FIGS. 3-4 and the assembly or mounting line M2). The slide path 66 is formed by two opposite arched edges between the holding ribs 24 which, thus, form respective axial stops for respective carbon guides 48 in the direction of the stator 12.

In this way, the carbon guides 48 and, with them, the carbon brushes 50 are exactly secured in both rotational positions of the brush carrier 30 against the commutator 10 both in the pivot direction S and the axial direction parallel to the commutator axis K. Thereby, a reliable fitting position of the carbon brushes 50 against the commutator 10 and, thereby, a uniformly good commutation is ensured.

In order to achieve, beside the rotational positions, a satisfactory secure position in a direction away form the stator, the brush carrier 30 can be supported on a correspondingly formed support members, not shown, of the power tool housing 18. Such support members can be provided, e.g., on the tool housing cover 68 shown in FIG. 1 and against which the reversing device is supported, providing for a permanent bearing of the carbon guides 48 in the protection region 62 against the slide path 66.

FIGS. 3-4 further show leaf spring 70 held on the brush carrier 30. The two rounded ends 72 of the leaf spring 70 extend radially outwardly through two opposite openings 74 formed in the brush holder 30. In the assembled condition, the two ends 72 are supported opposite each other on two concave support surfaces 76 provided on the contact carrier 28 (please see FIG. 2). In this way, the brush carrier 30 is additionally centered against the contact carrier 28.

In the rotational positions, as a result of clamping of the switching contacts 52a, 52b which move in the pivot direction, in the respective fixed contacts 42a, 42b ensure a reliable electrical connection that is not sensitive to vibration and impacts to the most possible extent.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. An electrical hand-held power tool (2), comprising:
   an electric motor (4) including:
   a stator (12) having:
   a stator housing (16); and
   a stator winding (14); and
   a device (26) for reversing a rotational direction of the electric motor (4), the reversing device (26) including:
   a contact carrier (28) fixedly and releasably securable on the stator housing (16) by releasable connection means,
   field contact means (32) for an electrical connection with the stator winding (14) and fixed contacts means (42a, 42b) electrically connected with the field contact means (32), and
   a brush carrier (30) provided with carbon guides (48) and switching contact means (52a, 52b) electrically connected with the carbon guides (48) and electrically connectable with the fixed contact means (42a, 42b) of the contact carrier (28), the brush carrier (30) being rotatable relative to the contact carrier (28), the stator housing (16) having an axial stop for the brush carrier (30) with the brush carrier (30) directly contacting the stator housing (16) over the axial stop.

2. An electrical hand-held power tool according to claim 1, wherein the axial stop is formed by a slide path (66) formed in the stator housing (16) and along which the carbon guides (48) are displaceable.

3. An electrical hand-held power tool according to claim 1, wherein the carbon guides (48) are provided with inclined surfaces (56) which abut, in two rotational end positions, correspondingly inclined bearing surfaces (60) formed on respective circumferential stops (58a, 58b) projecting from the stator housing (16), whereby the carbon guides (48) are pressed against the axial stop.

4. An electrical hand-held power tool according to claim 1, wherein spring means acting in radially opposite directions is provided between the brush carrier (30) and the contact carrier (28) at two circumferentially opposite positions.

5. An electrical hand-held power tool according to claim 4, wherein the spring means is formed by a leaf spring (70) supported on the brush carrier (30) and having two rounded ends (72) extending through respective openings (74) of the brush carrier (30) and supported against the contact carrier (28).

6. An electrical hand-held power tool according to claim 1, wherein the fixed contact means (42a, 42b) is formed by respective jaw-shaped contacts between which respective contacts of the switching contact means (52a, 52b) are claimed.

7. An electrical hand-held power tool according to claim 1, wherein the brush carrier (30) is axially supported, at its end remote from the stator (12), against a power tool housing (18).

* * * * *